United States Patent [19]
Zoggia

[11] Patent Number: 5,640,226
[45] Date of Patent: Jun. 17, 1997

[54] DEVICE FOR COLOR PHOTOGRAPH PRINTING

[75] Inventor: Antonio Zoggia, Mestrino, Italy

[73] Assignee: Ingenia s.r.l., Grezzana, Italy

[21] Appl. No.: 367,338

[22] PCT Filed: Jun. 8, 1994

[86] PCT No.: PCT/IT94/00079

§ 371 Date: Mar. 2, 1995

§ 102(e) Date: Mar. 2, 1995

[87] PCT Pub. No.: WO95/02849

PCT Pub. Date: Jan. 26, 1995

[30] Foreign Application Priority Data

Jul. 16, 1993 [IT] Italy ................. MO93A0091

[51] Int. Cl.[6] .................. G03B 27/32; G03B 27/46; G03B 27/58
[52] U.S. Cl. .................. 355/32; 355/34; 355/71
[58] Field of Search .................. 355/32, 52, 55, 355/71, 72; 354/102; 396/307; G03B 27/32, 27/52, 27/73

[56] References Cited

U.S. PATENT DOCUMENTS 3,759,155  9/1973  Bestenreiner.
4,087,174  5/1978  Nishikawa .................. 355/32
4,264,193  4/1981  Oonishi et al. .................. 355/32
4,522,491  6/1985  Ingalls et al. .................. 355/77
4,623,245  11/1986  Yu .................. 355/32
4,894,760  1/1990  Callahan .................. 362/293
5,471,344  11/1995  Sugawara .................. 359/566

FOREIGN PATENT DOCUMENTS 1597069  10/1969  Germany.
3346990  of 1985  Germany.

Primary Examiner—Arthur T. Grimley
Assistant Examiner—Herbert V. Kerner
Attorney, Agent, or Firm—Notaro & Michalos P.C.

[57] ABSTRACT

A device for printing color photographs on photosensitive paper having a segmented filter positioned relative to an inverting and focusing lens at a point where an original image projected through the lens at the paper is inverted. The segmented filter has colored segments corresponding to the primary colors to which the photosensitive paper is sensitive. The colored segments each have a surface area in a ratio corresponding to the relative sensitivity of the paper to the color of the segment. In an alternate embodiment, the filter has equal sized colored components and is moved with respect to an optical axis of the lens to adjust the intensity of each filtered monochromatic image projected onto the paper.

8 Claims, 1 Drawing Sheet

DEVICE FOR COLOR PHOTOGRAPH PRINTING

TECHNICAL FIELD

The invention relates to a device for colour photograph printing.

One of the most widespread processes for printing colour photographic images envisages that a negative or slide bearing the image to be printed be passed through by a light beam which has itself already passed through colour filters so that the beam contains predetermined primary colours which are subsequently localized by a lens onto photosensitive paper of known type. The particular colour percentage sensitivity of the paper depends on the kind of paper used: some are sensitive to red, green and blue (used in additive synthesis), others to yellow, magenta and cyan (used in subtractive synthesis). The actual percentage of sensitivity can vary within a range of similar paper: for example, it might be 30% red, 25% green and 45% blue.

The light beam is first prepared vis a vis the colours desired and the appropriate filters selected, and after it has crossed the film or slide, reaches the paper. Chromatic relationships must be extremely precise in order to obtain a faithful and exact colour reproduction on the paper.

BACKGROUND ART

In known-type processes the light beam colour percentages reaching the paper are greatly influenced by the type of negative support used and the exposure quality of the image contained on it: the light beam is in fact strongly chromatically and densitometrically affected by the type of support, so that results can vary greatly.

This problem is at present resolved by providing a considerable number of colour filters to filter the light coming from the source before it reaches the negative support. The drawback with this process is that for each type of negative support suitable filters are required and have to be painstakingly selected.

In modern enlargers the selection of the correct filters from the set mounted on the enlargers is made by analyzing the beam after said filters have been selected, which is usually done automatically, and making a final choice after some test runs of this nature. Amateur photographers, however, usually possess non-automatic devices and thus have to try out several different filter combinations before obtaining a satisfactory result.

A principal aim of the present invention is to obviate the above drawbacks by providing a device which permits of obtaining a light beam having a chromatic composition that is not influenced by the quality and type of negative support bearing the image to be developed.

An advantage of the device is that it obtains the desired result while remaining very simple and economical.

DISCLOSURE OF INVENTION

The aims and advantages are achieved by the device of the invention, as it is characterized in the claims that follow, which comprises a light source generating a beam which crosses a negative support bearing a photographic image to be printed, and which localizes the image on to photosensitive paper of a known chromatic sensitivity, wherein at the point of image inversion a circular filter exhibiting coloured segments of equal area is disposed perpendicularly to the lens optical axis, said filter having a dealigned axis in relation to the optical axis, with an interaxis between the two axes being adjustable.

Further characteristics and advantages of the present invention will better emerge from the detailed description that follows, of a preferred but non-exclusive embodiment here illustrated in the form of a non-limiting example in the accompanying drawings, in which.

The device comprises a light source 1 constituted, for example, by a normal light bulb such as those present in all devices of this type. The light source 1 generates a beam which crosses a support 2, for example a negative, bearing the image to be printed.

The device further comprises a known-type lens, schematically denoted by 3, by means of which the light, having crossed the support 2, is focused on photosensitive paper 4.

A filter 5 is arranged at the image inversion point, which filter 5 is subdivided into a number of equal segments of different colours, which number will correspond to a number of primary colour sensitivities of the paper 4 used: if, for example, the paper 4 is sensitive to red, green and blue, the filter 5 will exhibit three colour segments of the same colours.

The entire light beam, having passed through the support 2, passes through the image inversion zone, or the zones immediately before and after it: in other words, there occurs a complete superposition of chromatic images determined by the passage of the light beam through the support 2. Further, it has been observed that at this zone, even when a part of the passing beam is obscured, there is still a complete passage of the image through the part of the beam which is not obscured: thus, the whole image will pass through each of the filter zones, and downstream of the filter there will be three full images, each in a desired primary colour.

The filter 5 must be able to create an output beam having the same chromatic percentages as the photosensitive paper 4: if, for example, the paper 4 is 30% sensitive to red, 35% to green and 45% to blue, the filter 5 must be able to reproduce exactly those percentages.

Figure 1:
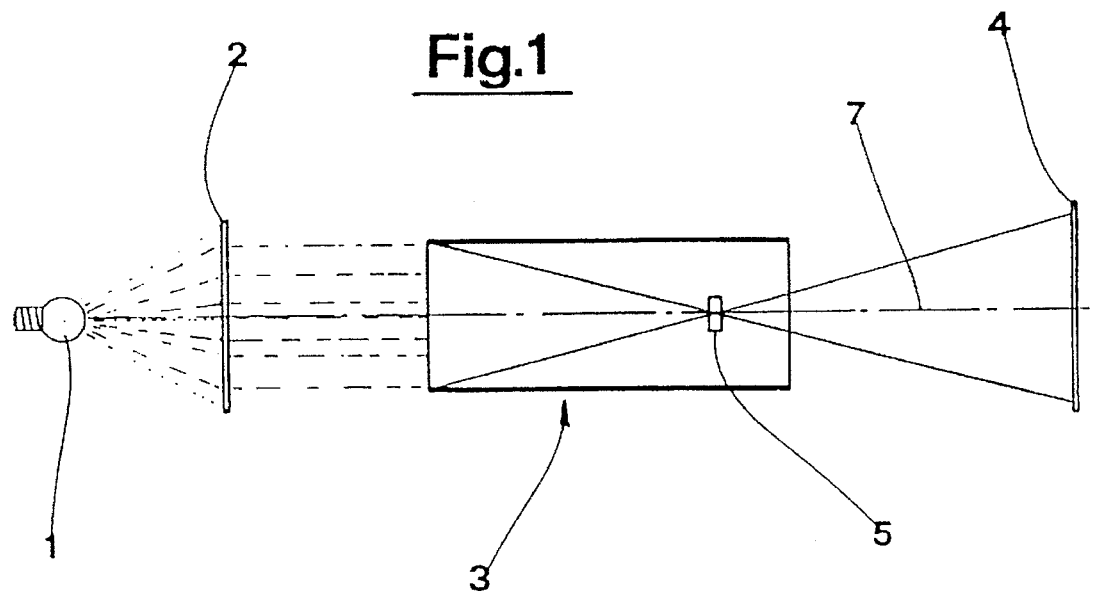
FIG. 1 shows a diagram of the device of the invention.
Figure 2:
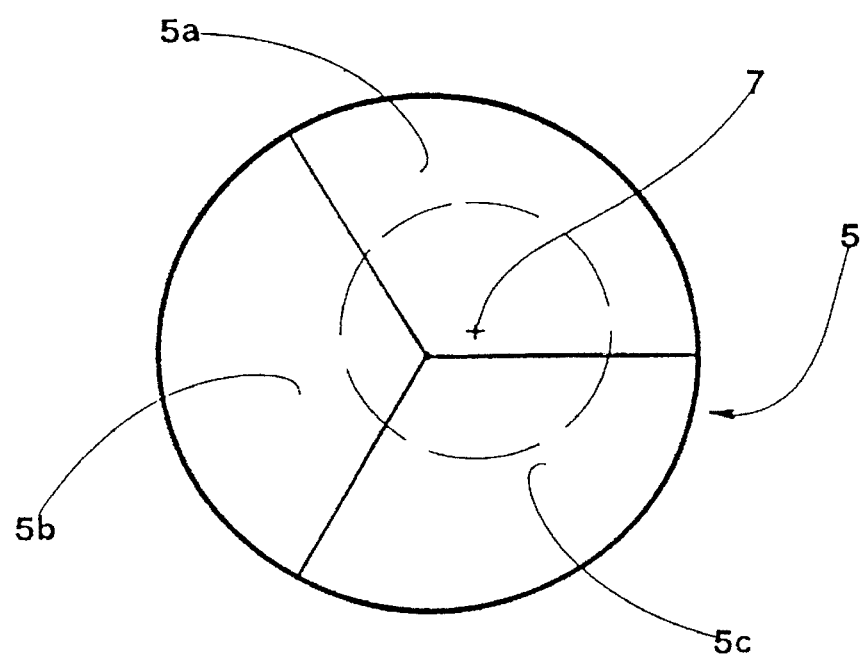
FIG. 2 shows an enlarged schematic view of the filter of the device.

One possible and extremely simple embodiment of the filter is illustrated in FIG. 2. The filter 5 is circular and exhibits a number of segments 5a, 5b and 5c, each of which is in a primary colour and is equal in size to the other segments. The filter 5 is disposed perpendicularly to the optical axis 7 and its axis is dealigned in relation to the optical axis, with an adjustable interaxis. Thus, according to how the filter 5 is dealigned with respect to the optical axis, each coloured sector will be more or less invested by the beam, and it will be possible to reproduce colour percentages which perfectly correspond to the sensitivity percentages of the paper 4.

This is different to prior art teachings, where the filters, disposed between the light source 1 and the support 2 have to be adapted on each occasion to the type of support 2. In the device of the invention, the filter can be positioned and not only receives all of the image on each of the coloured zones and provides three images in the desired colours, but also provides a beam having a chromatic composition which is independent of the type of support used and which chromatic percentages can be varied, by means of a very simple process, in accordance with the type of photosensitive paper 4 used.

I claim:

1. A device for recording a color image on a photosensitive medium (4) of known chromatic sensitivity to each of a plurality of primary colors, the device comprising:

lens means (3) for focusing a light image along an optical axis (7) and for forming an image inversion point along the optical axis;

support means for supporting the photosensitive medium at a spaced location from the lens means and across the optical axis so that the lens means focuses the light image onto the photosensitive medium;

a filter (5) disposed near the inversion point and across the optical axis, the filter having a plurality of segments (5a, 5b, 5c) each colored to correspond to a different one of the plurality of primary colors, the segments all extending outwardly of a common point on the filter; and alignment means connected between the lens means and the filter for offsetting the common point on the filter from the optical axis in selected directions and by selected amounts so that surface areas of each filter segment through which the light image passes are adjusted for the sensitivity of the photosensitive medium to the primary colors.

2. A device according to claim 1, wherein the lens has an optical axis, and further comprising adjusting means for moving the filter with respect to the optical axis, such that a chromacity of the image projected onto the photosensitive paper is changed when the filter is moved.

3. A device according to claim 2, wherein the filter is circular, the segments being equally sized arcuate segments of the circular filter.

4. A device according to claim 3, wherein the circular filter is divided into equally sized arcuate segments by a plurality of radial lines extending from a center of the filter to a circumference of the filter, the number of lines corresponding to the number of segments.

5. A device according to claim 4, wherein there are three segments, one segment being colored blue, a second segment being colored red, and a third segment being colored green.

6. A device according to claim 1, wherein the filter is comprised of three segments.

7. A device according to claim 6, wherein one segment is colored blue, a second segment is colored green and a third segment is colored red.

8. A method for recording a color image on a photosensitive medium (4) of known chromatic sensitivity to each of a plurality of primary colors, the method comprising:

focusing a light image along an optical axis (7) and for forming an image inversion point along the optical axis;

supporting the photosensitive medium across the optical axis at a location so that the light image is focused onto the photosensitive medium;

positioning a filter (5) near the inversion point and across the optical axis, the filter having a plurality of segments (5a, 5b, 5c) each colored to correspond to a different one of the plurality of primary colors, the segments all extending outwardly of a common point on the filter; and aligning the filter for offsetting the common point on the filter from the optical axis in selected directions and by selected amounts so that surface areas of each filter segment through which the light image passes are adjusted for the sensitivity of the photosensitive medium to the primary colors.

* * * * *